(12) United States Patent
De Frenne

(10) Patent No.: US 8,172,052 B2
(45) Date of Patent: May 8, 2012

(54) RAPID RECOVERY SHOCK ABSORBER SYSTEM WITH HYDRAULIC END STOP AND METHOD FOR USE THEREOF

(75) Inventor: Pierre De Frenne, Montauban (FR)

(73) Assignee: Amortisseur Donerre, Montech (FR)

( * ) Notice: Subject to any disclaimer, the term of this patent is extended or adjusted under 35 U.S.C. 154(b) by 1529 days.

(21) Appl. No.: 10/599,956

(22) PCT Filed: Apr. 26, 2004

(86) PCT No.: PCT/FR2004/001005
§ 371 (c)(1),
(2), (4) Date: Oct. 16, 2006

(87) PCT Pub. No.: WO2005/111459
PCT Pub. Date: Nov. 24, 2005

(65) Prior Publication Data
US 2007/0205063 A1  Sep. 6, 2007

(51) Int. Cl.
*F16F 9/34* (2006.01)
*B60G 13/00* (2006.01)
(52) U.S. Cl. ......... 188/322.15; 188/322.13; 188/322.19; 188/322.22; 188/321.11; 188/284; 267/220; 267/162
(58) Field of Classification Search ............ 188/322.15, 188/322.13, 322.19, 322.22, 321.11, 284; 267/220, 162
See application file for complete search history.

(56) References Cited

U.S. PATENT DOCUMENTS

| | | | | |
|---|---|---|---|---|
| 4,166,612 A | * | 9/1979 | Freitag et al. | 267/64.15 |
| 4,386,766 A | * | 6/1983 | Bauer et al. | 267/64.12 |
| 5,339,930 A | * | 8/1994 | Sich et al. | 188/210 |
| 6,161,662 A | | 12/2000 | Johnston et al. | |
| 6,189,663 B1 | * | 2/2001 | Smith et al. | 188/322.22 |
| 6,659,239 B2 | * | 12/2003 | Van Wonderen et al. | 188/282.1 |
| 2002/0175035 A1 | | 11/2002 | Achenbach | |

FOREIGN PATENT DOCUMENTS

| FR | 2 796 431 A | 1/2004 |
|---|---|---|
| WO | WO 2004/040164 A | 5/2004 |

OTHER PUBLICATIONS

International Search Report, Jan. 10, 2005, from International Phase of the instant application. English Translation of the Written Opinion of the International Search Authority, Nov. 14, 2006, from International Phase of the instant application.
English Translation of International Preliminary Report on Patentability Chapter I, Nov. 14, 2006, from International Phase of the instant application.

* cited by examiner

*Primary Examiner* — Bradley King
*Assistant Examiner* — Mahbubur Rashid
(74) *Attorney, Agent, or Firm* — Jackson Patent Law Office

(57) ABSTRACT

The invention relates to a rapid recovery shock absorber system with hydraulic end stop, comprising a stem (3) and a body (1), in which a piston (8, 9, 10, 11) runs which is fixed to a tube (71) and which defines at least one upper chamber (S) and one lower chamber (I) in the body (1). A body (32, 32*a*) in the stem (3) comprises a housing (321), in which a piston (33, 33*a*) runs which is connected to a rod (7) which slides in the tube (71). A clamp (31), for fixing the shock absorber system to the vehicle, tensioning means (35, 37, 39), exerting a force which tends to displace the piston (33, 33*a*), sliding in the stem body (32, 32*a*), driving the displacement of the rod (7) which results in the opening or closing of a section of an oil passage in the lower chamber (I) towards the upper chamber (S) are also provided.

15 Claims, 12 Drawing Sheets

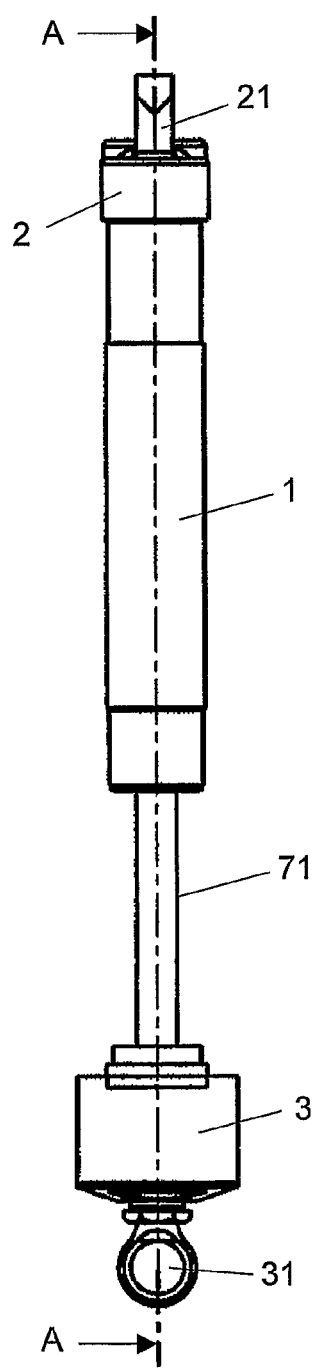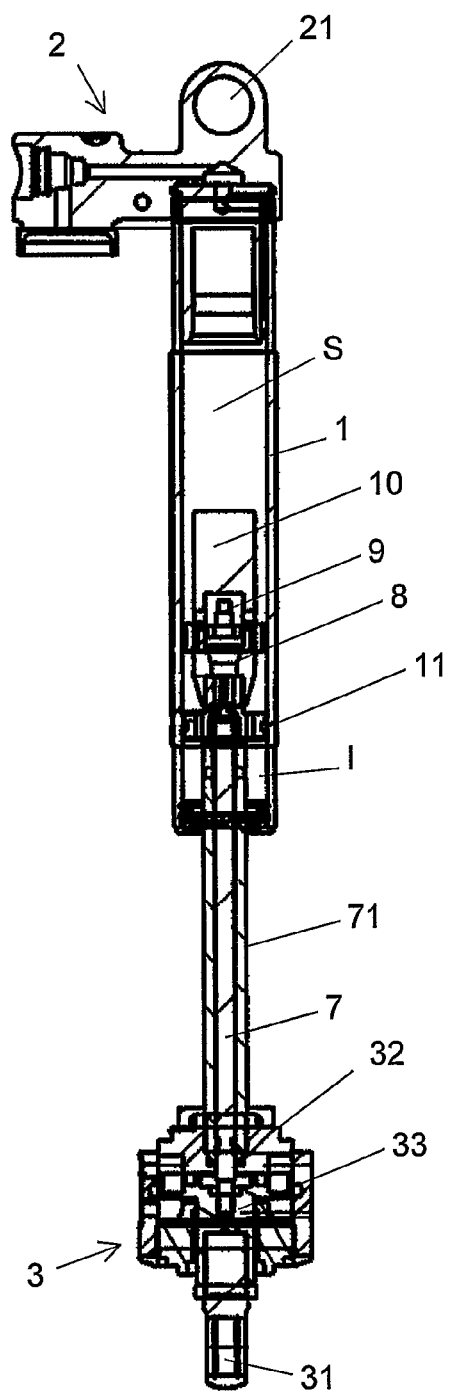
Figure 1
Figure 2

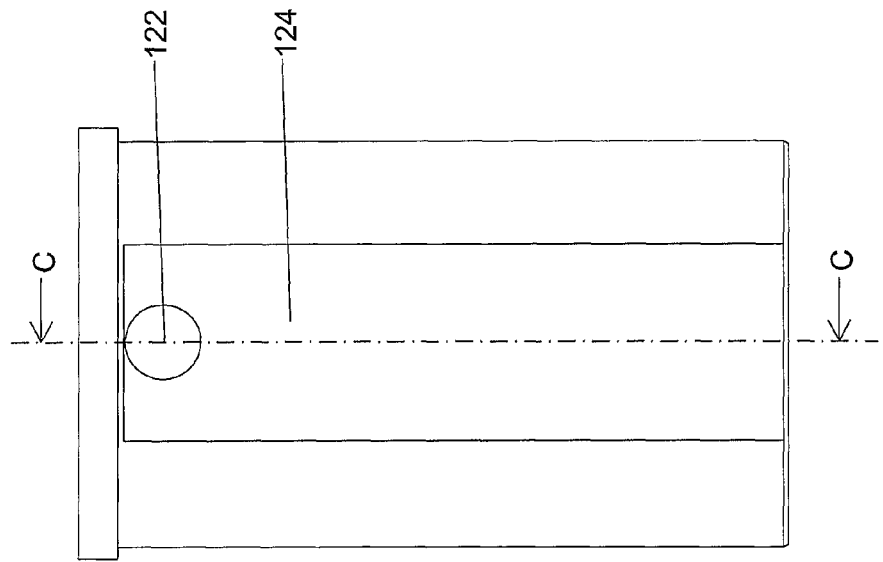
Figure 14
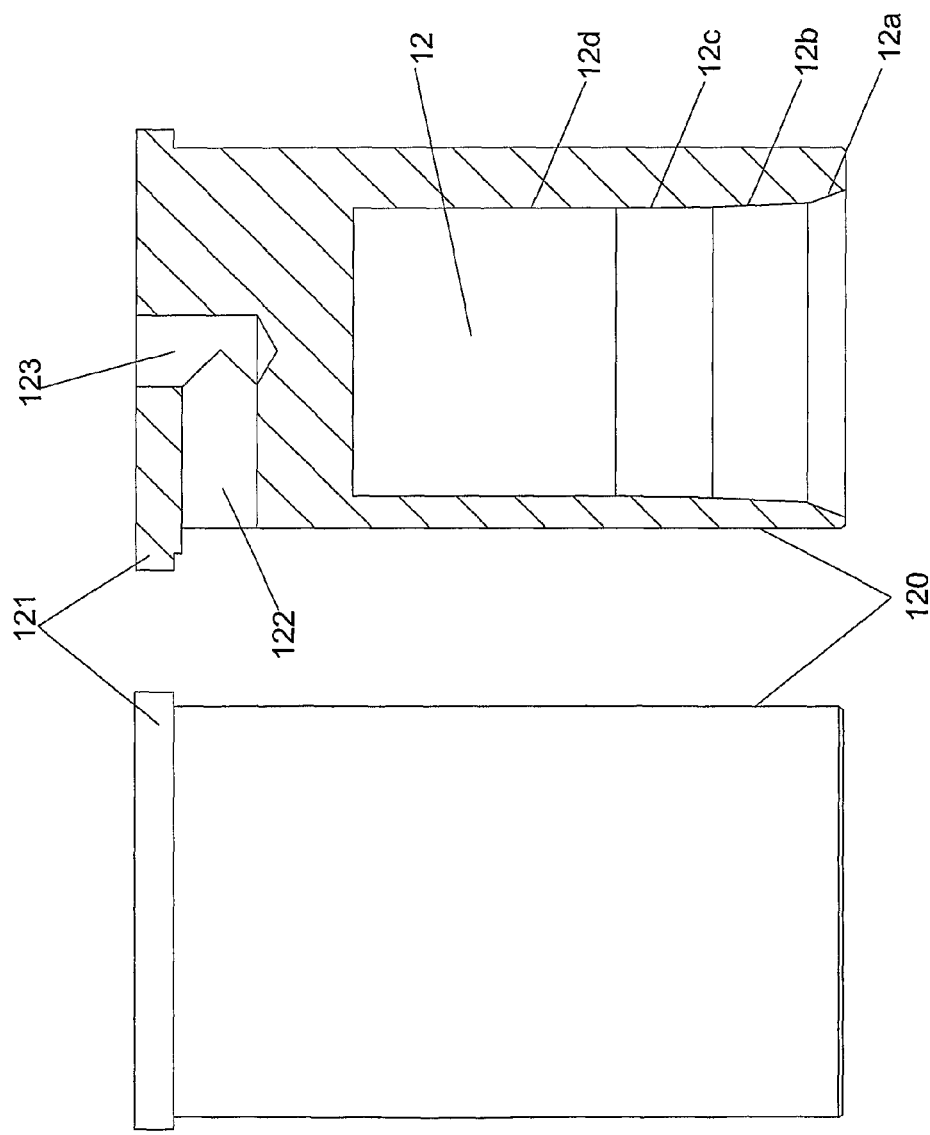
Figure 13
Figure 12

RAPID RECOVERY SHOCK ABSORBER SYSTEM WITH HYDRAULIC END STOP AND METHOD FOR USE THEREOF

The present invention relates to a hydraulic system of shock absorbers, provided with a rapid recovery system and a hydraulic end stop, intended for automobile vehicles.

The function of a rapid recovery system is to allow the shock absorber to react in an adapted manner when the reaction with the ground no longer balances the weight of the vehicle, for example during the passage of the wheel in a hole or when the wheel lifts off from the ground. In fact, in these conditions, a shock absorber lacking a rapid recovery system is going to recover in a manner too slow to follow the profile of the hole. Consequently, when the reaction with the ground again becomes elevated by the resumption of contact of the wheel with the ground, the shock absorber system, which is not in its maximum recovery position, cannot therefore assure an optimal shock absorption.

A shock absorber system, reacting to the reductions or annulations of the reaction force with the ground, is known from the patent application FR 2 796 431, filed by the applicant, This system includes a body in which slides a piston mounted at the upper and of a rod. The position of the piston in the piston body defines an upper chamber and a lower chamber. The piston includes, in addition to channels sealed by a pre-loaded washer defining the compression characteristics of the shock absorber system, a free passage between the upper chamber and the lower chamber. This free passage, which is sealed in normal functioning, is opened when the reaction with the ground no longer balances the weight of the vehicle, which drives a rapid recovery of the system. This is realized by the presence of a channel in the interior of the rod, communicating with a chamber included in the stem of the shock absorber. A disadvantage of this shock absorber system is that the force with which is produced the opening of the free passage is not modifiable depending on the vehicle to which the shock absorber system is intended or the type of terrain on which the vehicle it is intended to maneuver. A second disadvantage of this system is that, when the piston bumps against the upper internal surface of the shock absorber body, one has a metal against metal contact that leads to a premature wearing of the shock absorber and noise for the user.

The function of the end stop piston is to dampen the arrest of the jack rod of the shock absorber when it is compressed into the body of the shock absorber and reaches the point of maximum compression. In fact, when the vehicle is encountering a bump or hole, the rod is compressed at high velocity into the body of the shock absorber up to reaching in certain cases the maximum of its stroke. The presence of the end stop must allow avoiding sudden "bottoming out" of the shock absorber. It is known in the prior art hydraulic shock absorbers provided with end stops made of cushioning material such as rubber, but this type of end stop poorly resists violent and repetitive shocks.

It is known from the patent application FR 0213644, in the name of the applicant, a shock absorber system with rapid recovery provided with an upper piston that forms, in its upper part, a hydraulic end stop piston intended to trap and compress a volume of oil contained in an end stop body arranged at the upper end of the shock absorber body.

The goal of the present invention is to offer a shock absorber system with rapid recovery in which the force with which is produced the passage from a slow relaxation to a rapid relaxation is adjustable depending on the vehicle to which the shock absorber is intended or the type of terrain on which the vehicle is intended to maneuver.

This goal is achieved by a shock absorber system including a stem and a body, in which slides a piston mounted on a first end of a tube and defining at the least an upper chamber and a lower chamber in the body, the stem of the shock absorber including a stem body, joined to the second end of the tube and supporting a cup on which a spring transmits the weight of the vehicle, characterized in that the stem body includes an approximately cylindrical housing, in which slides a piston, an end of the piston being joined to a first end of a rod sliding in the tube and another end of the piston being joined to an attachment fastener of the shock absorber on the vehicle, and in that prestressing means exert a force that tends to displace the piston sliding in the stem body, driving the rod in its displacement, depending on the balance between the force applied on the fastener joined to the stem piston and the force exerted by the prestressing means, the displacement of the rod towards the bottom resulting in the opening, at the second end of the rod, of a larger section for passage of the oil from the lower chamber towards the upper chamber and, consequently, a rapid recovery of the shock absorber system.

According to another particularity, the piston is constituted by an end stop piston and an annular piece coupled between themselves by a hollow extension, and defining an upper chamber, an intermediate chamber and a lower chamber, the end stop piston including a recess in which is lodged an anti-return valve sealed by a foil washer overbridged by a spring, and in that the oil passage from the lower chamber towards the upper chamber includes a recess of an annular piece in which the second end of the rod, having a rectangular section, forms vertical channels, that communicate, on the one hand, with a cavity situated between the rod and the tube, in communication with the lower chamber, via radial channels bored in the tube and, on the other hand, with the interior of the hollow extension, in communication with the upper chamber, via the anti-return valve, the recess and the passage sections of the end stop piston, this opening of a larger section of the oil passage allowing a rapid recovery of the shock absorber system.

According to another particularity, the prestressing means include a pressure differential between pneumatic cavities, situated on each side of the piston, this pressure differential allowing definition of the direction and the value of the prestressing force applied on the piston.

According to another particularity, the prestressing means include a plurality of conical spring washers interposed between the piston and the upper or lower surfaces, respectively, of the housing, the recovery of the aforementioned washers pushing back the piston, respectively, towards the bottom or towards the top, thus defining the direction and the value of the prestressing force applied on the piston.

According to another particularity, the conical spring washers are mounted in opposition two by two.

According to another particularity, the number of conical spring washers is between 5 and 20.

According to another particularity, the reaction force with the ground with which is produced the opening of a larger section of the oil passage between the cavities is adjustable, according to the mode of execution, by the pressure differential of the upper and lower chambers, or by the number, the shape, the piling and the position of the washers, which applying a prestressing force on the upper or lower stem piston, respectively, to the force applied on the fastener drives the positioning of the stem piston joined to the rod, respectively, in lower or upper position, respectively selecting a rapid or conventional recovery law.

According to another particularity, the adjustment system is constituted by two inflation valves filled with air under pressure, each in communication with a cavity, the evacuation or the filling of the aforementioned cavities by the inflation valves acting on the pneumatic piston coupled to the rod.

A second goal the present invention is to mitigate the disadvantages of the prior art by offering an end stop allowing a progressive arrest of the rod of the shock absorber whatever its speed of compression into the body, which eliminates the metal against a metal rubbing between the piston and the end stop body, and which conserves the shock absorbing characteristics approximately constant over time.

This goal is achieved by a shock absorber system according to the invention, characterized in that the body of the shock absorber also includes an end stop body attached at its upper end, a cylindrical portion of the end stop piston trapping and compressing a volume of oil contained in an open internal housing of the end stop body during the movement of compression of the shock absorber, the internal housing of the end to stop body being symmetric with respect to an axis of revolution and provided with a tapered input portion, followed by several tapered portions, of decreasing taper, the portion near the base of the housing being cylindrical and having a diameter slightly greater than the diameter of the end stop piston, to allow, in the course of the movement of compression of the end stop piston in the housing, that a fraction of the volume of the oil contained in the end stop body can reflow between the piston and the end stop body, this fraction diminishing with the advancement of the end stop piston, which allows generating a resistance to the increasing compression, which also permits the formation of a film of oil having high pressure between the piston and the end stop body, which lubricates the contact between the surfaces of these two pieces during alternate and repetitive movements of the end stop piston in the housing of the end stop body.

According to another particularity, the end stop body is a cylinder of revolution having a diameter approximately equal to the interior diameter of the shock absorber body, a flat section being built from the lower end of the end stop body up to a radial boring emerging on a second vertical boring situated at the summit of the end stop body, to the center of the latter, the two borings communicating between themselves, the ensemble of the two borings and of the flat section embodying a free passage for the oil from the body towards the head of the shock absorber.

According to another particularity, the end stop piston includes at its lower end an enlarged portion, having a diameter approximately equal to the interior diameter of the shock absorber body, and provided with a plurality of vertical channels forming a free passage for the oil.

According to another particularity, the recess of the end stop piston includes a threaded portion that serves as a means of attachment of the extension, an anti-return valve being sandwiched between the base of the housing and the extension, the anti-return valve being provided with a plurality of vertical channels that communicate with channels coupling the recess to the exterior of the end stop piston when the anti-return valve is in open position, thus forming a free passage for the oil.

According to another particularity, the end stop piston is provided with radial horizontal channels coupling the housing interior to the periphery of the end stop piston.

According to another particularity, the end stop piston is provided with a plurality of vertical channels coupling the base of the housing to the horizontal surface constituting the end of the end stop piston near the end stop body.

According to another particularity, the end of the end stop piston near the end stop body has a tapered shape.

Another goal of the invention is to offer a method of using a shock absorber system with rapid recovery and hydraulic end stop, characterized in that it includes installing on the vehicle shock absorber systems with rapid recovery controlled by pneumatic pressure, this pressure being modifiable, by means of two valves, in each of the cavities situated on each side of the stem piston and determining the optimal values of pressure to allow the sliding of the piston in its housing in a manner adapted to the vehicle and to the encountered terrain subsequently replacing the shock absorber system having pneumatic control, in which the prestressing means are pneumatic cavities, by a system with rapid recovery in which the prestressing means are washers, of which the number, shape, piling, and position will be determined depending on the prestressing force corresponding to the determined pneumatic pressure.

The invention, with its features and advantages, will reemerge more clearly at the reading of the description made in reference to the annexed drawings in which:

FIG. 1 represents a plan view of the shock absorber system;

FIG. 2 represents a cross-sectional view of the shock absorber system according to the invention according to the plane A-A of FIG. 1;

Figure 3:
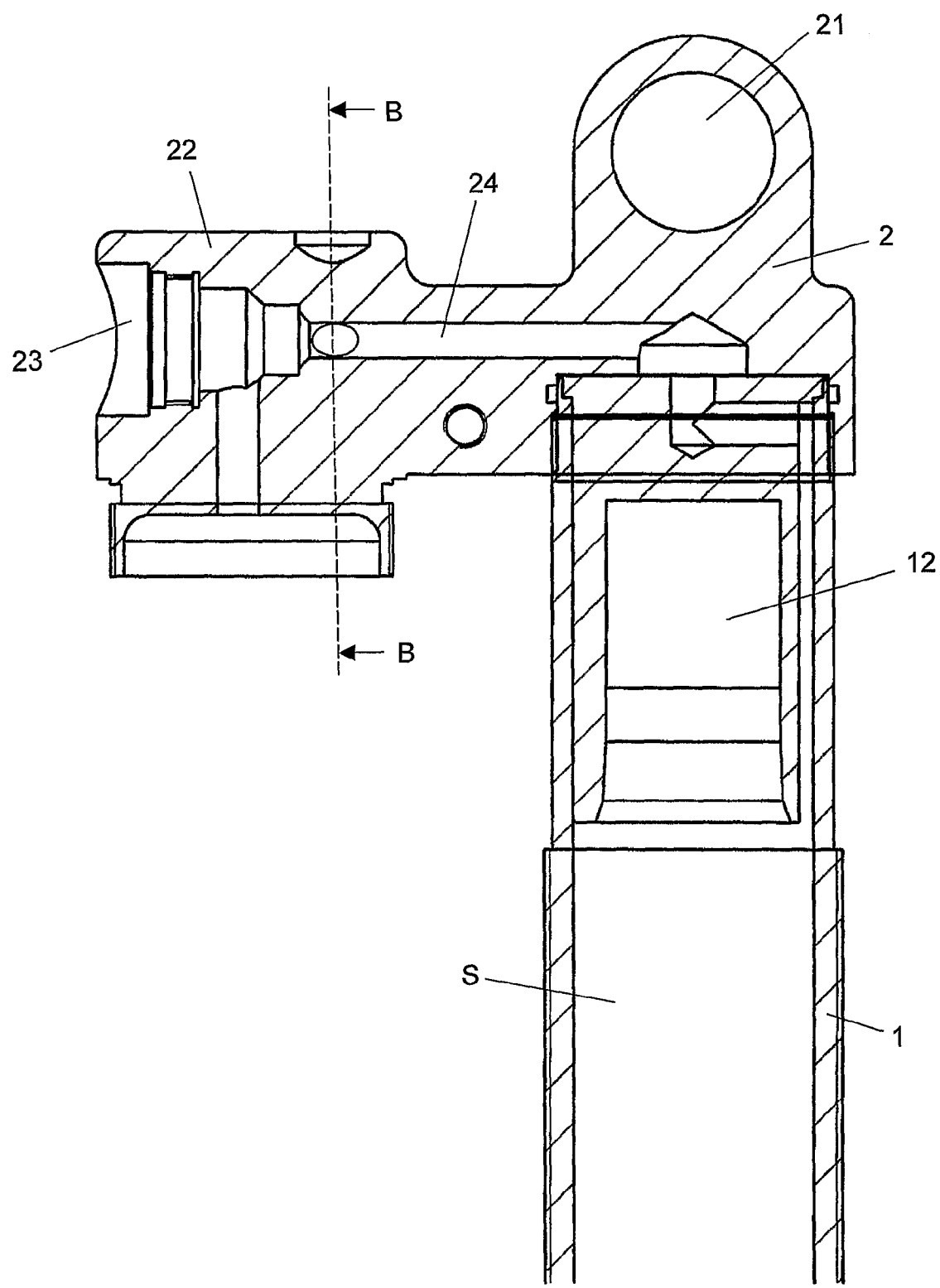
Figure 4:
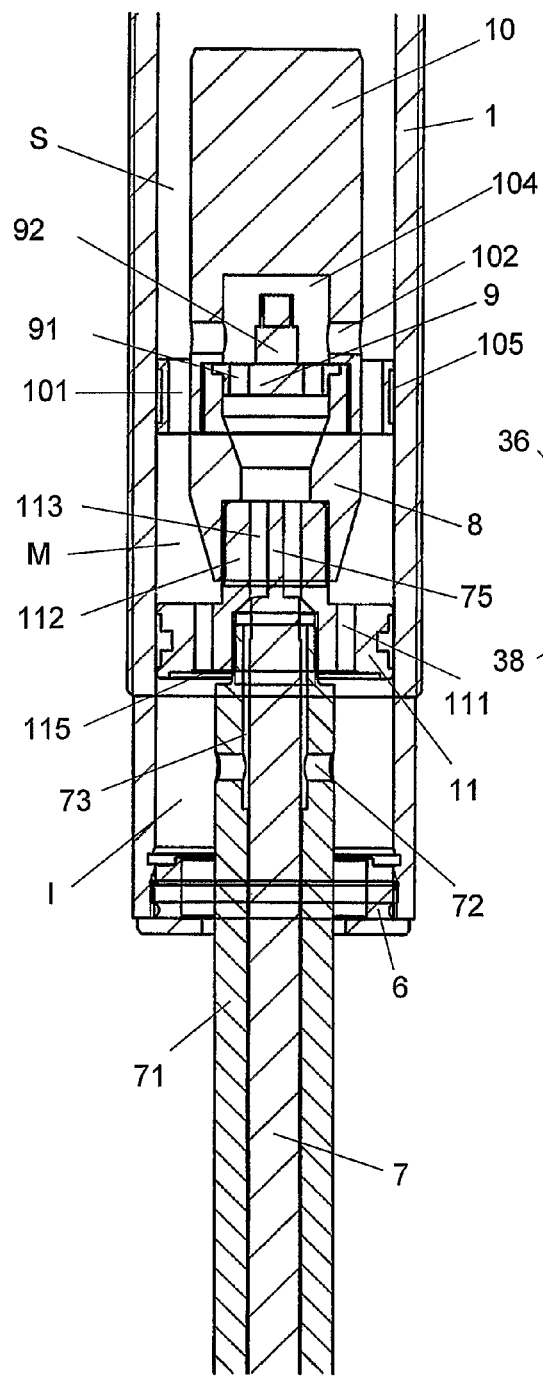
Figure 5:
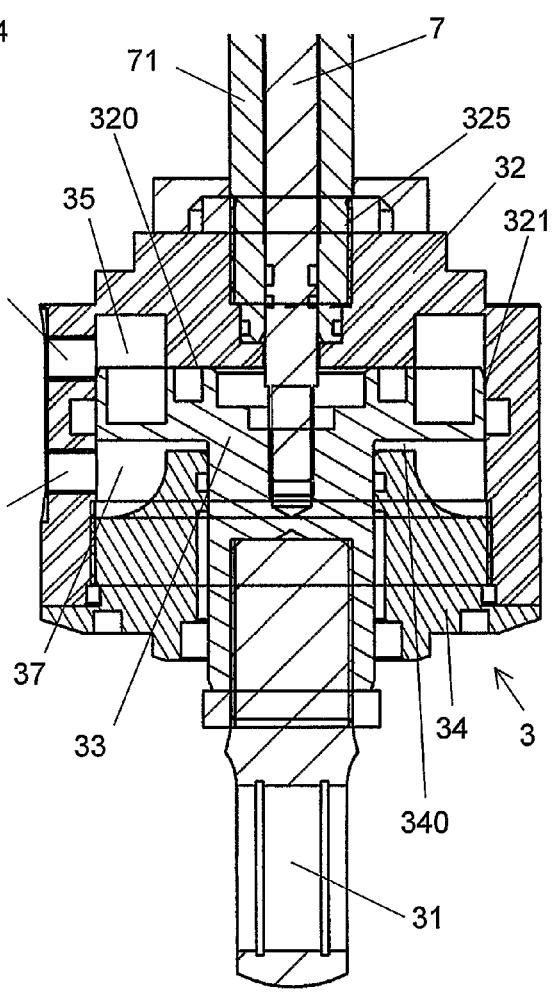
Figure 6:
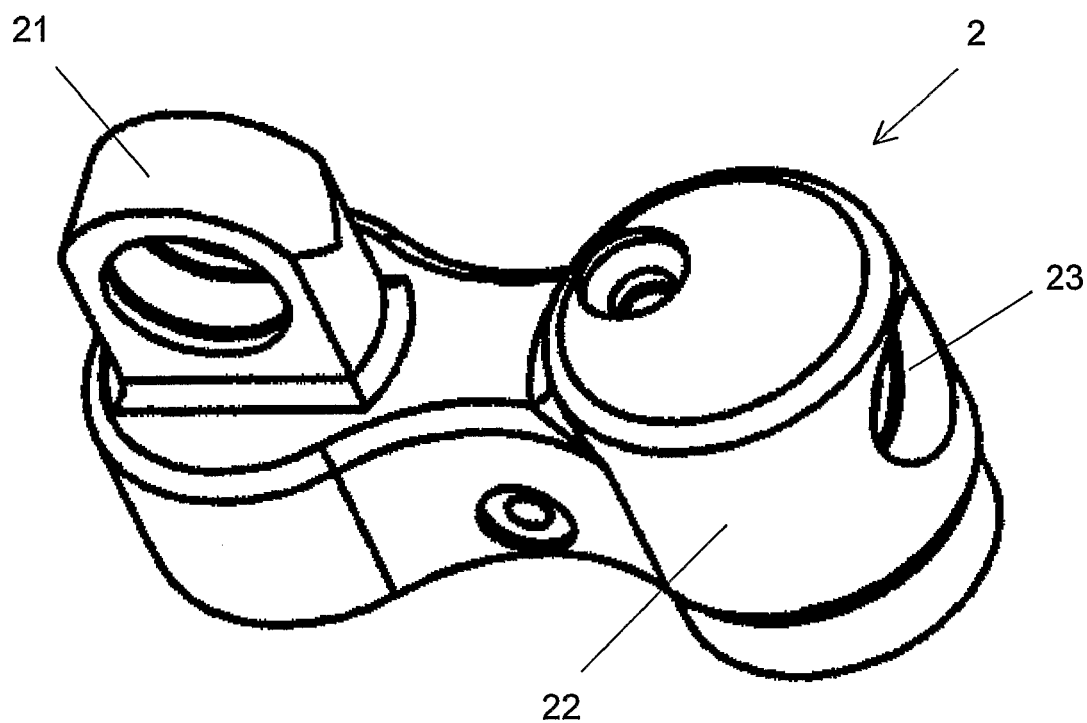
Figure 7:
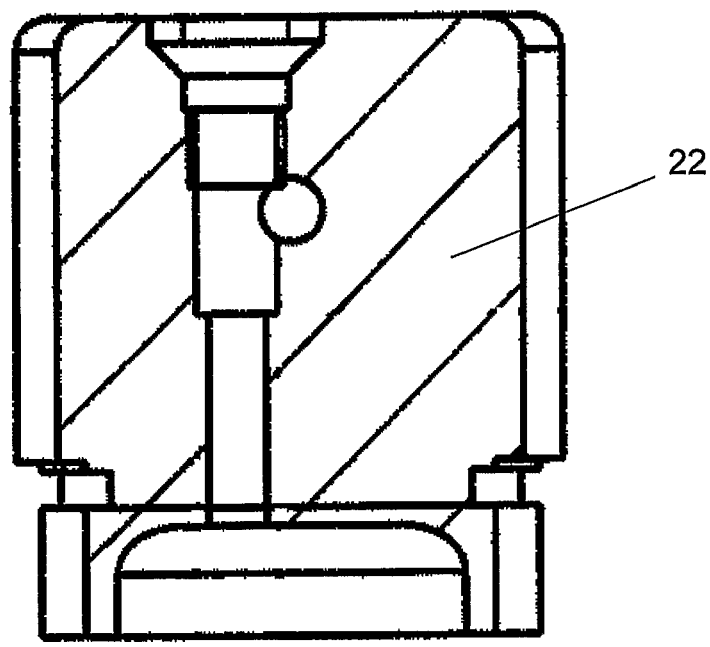
Figure 8:
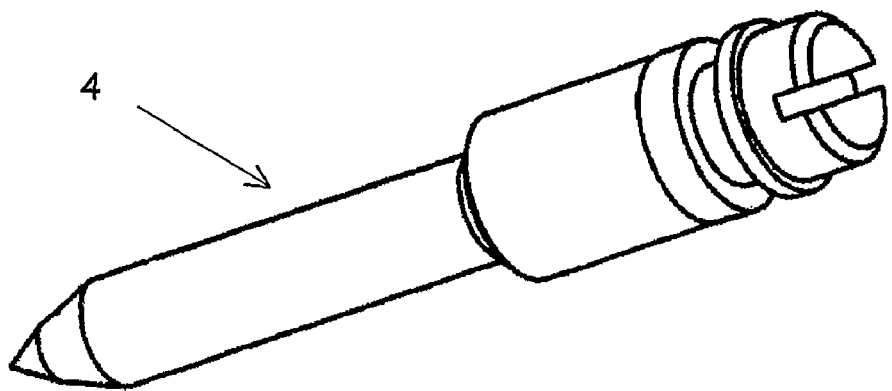
Figure 9:
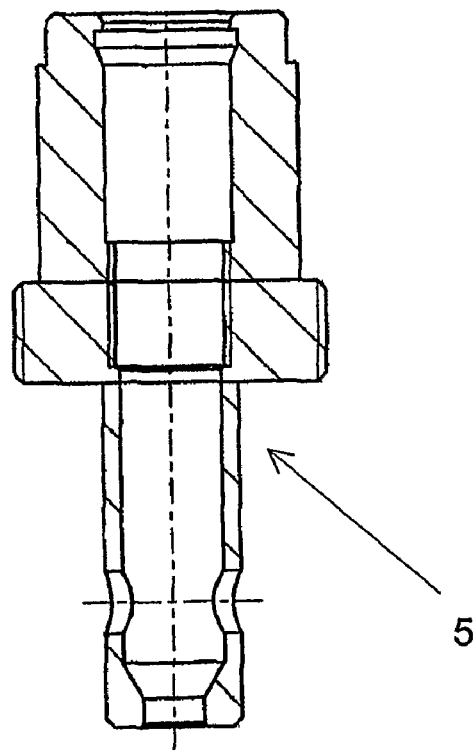
Figure 10:
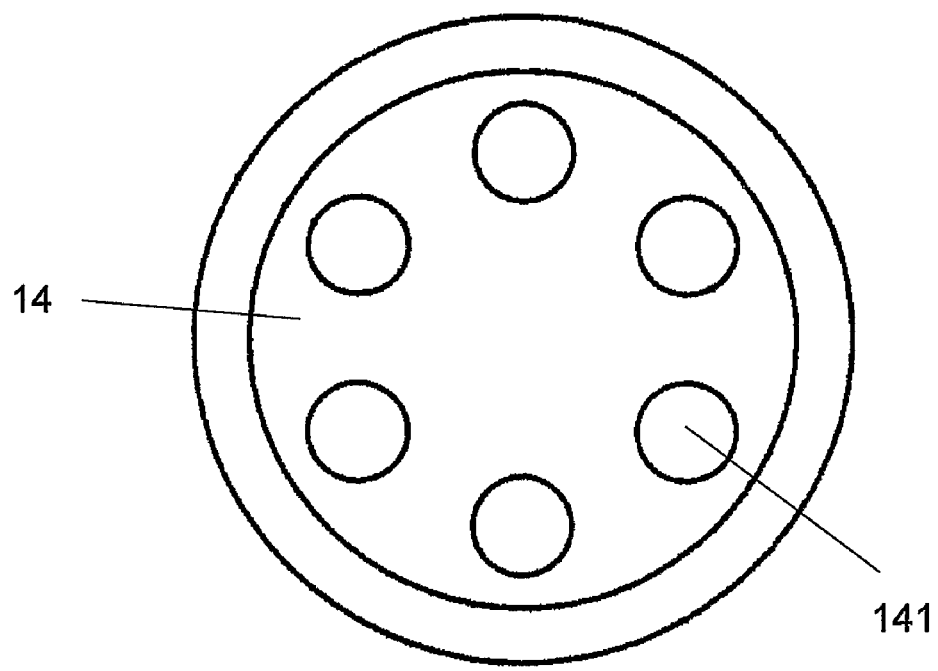
Figure 11:
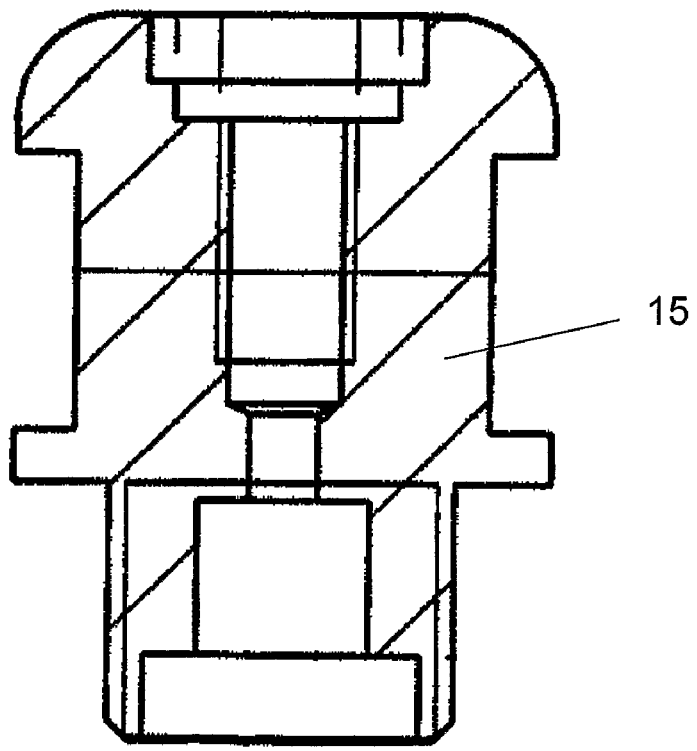
Figures 15, 16:
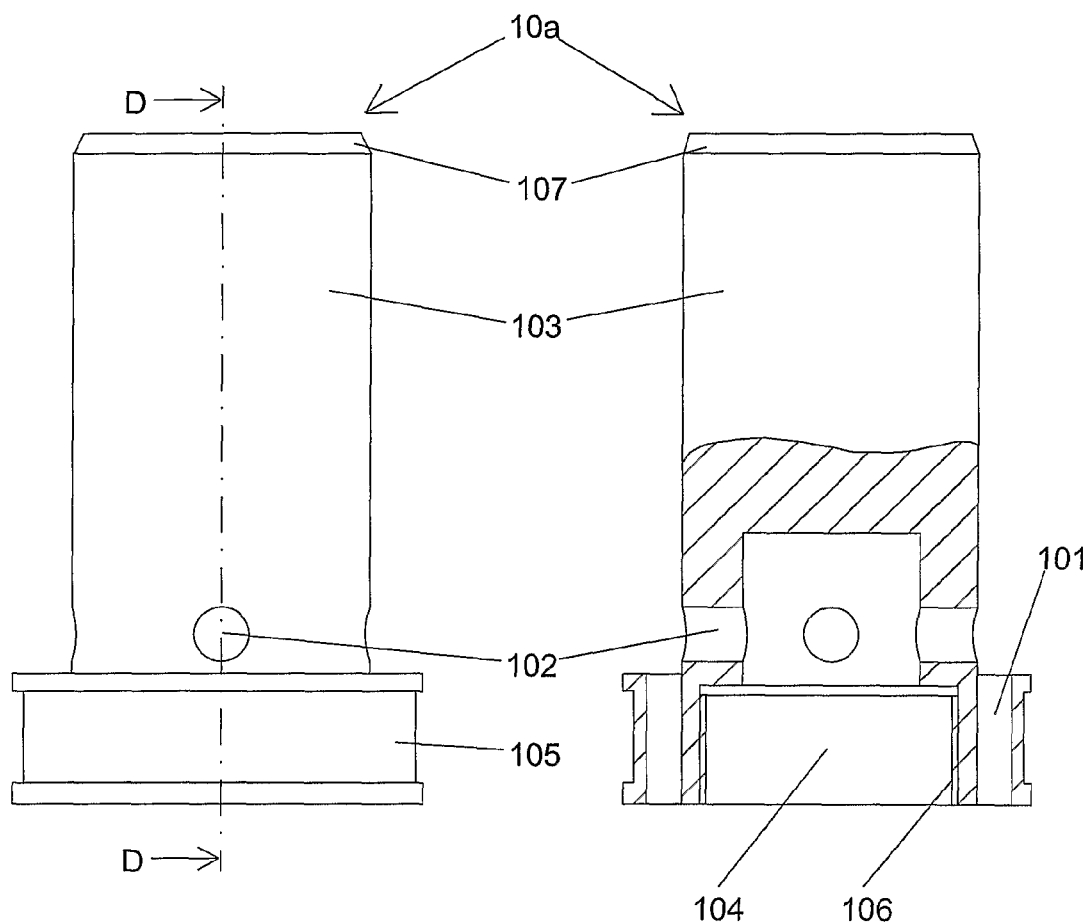
Figure 17:
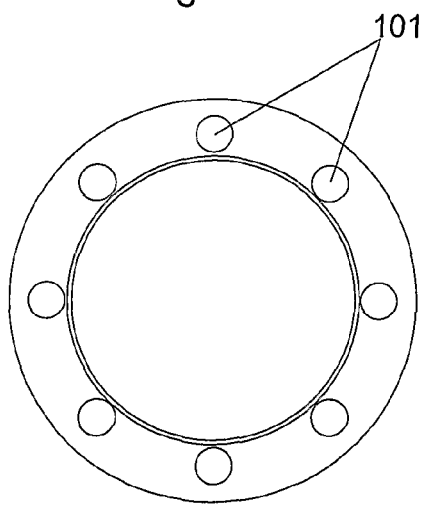
Figures 18, 19:
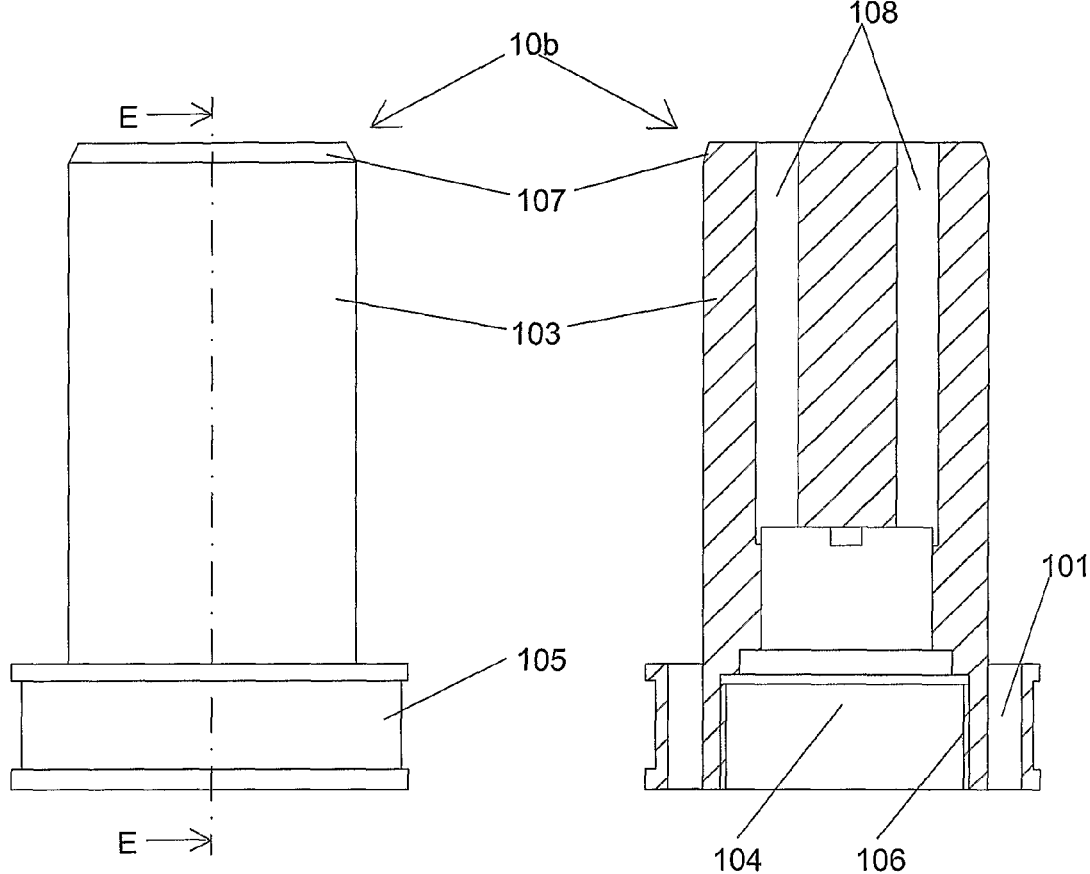
Figure 20:
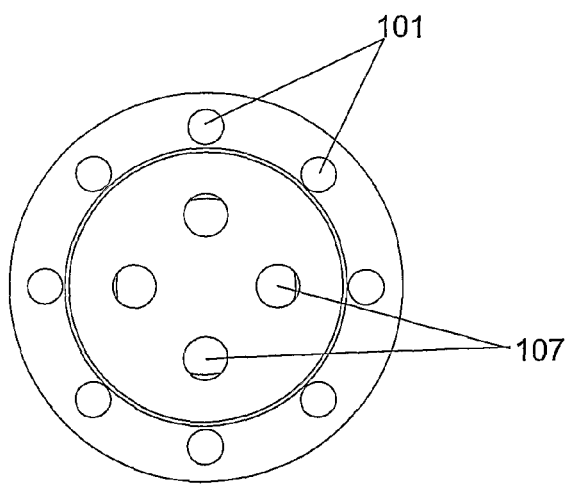
Figure 21:
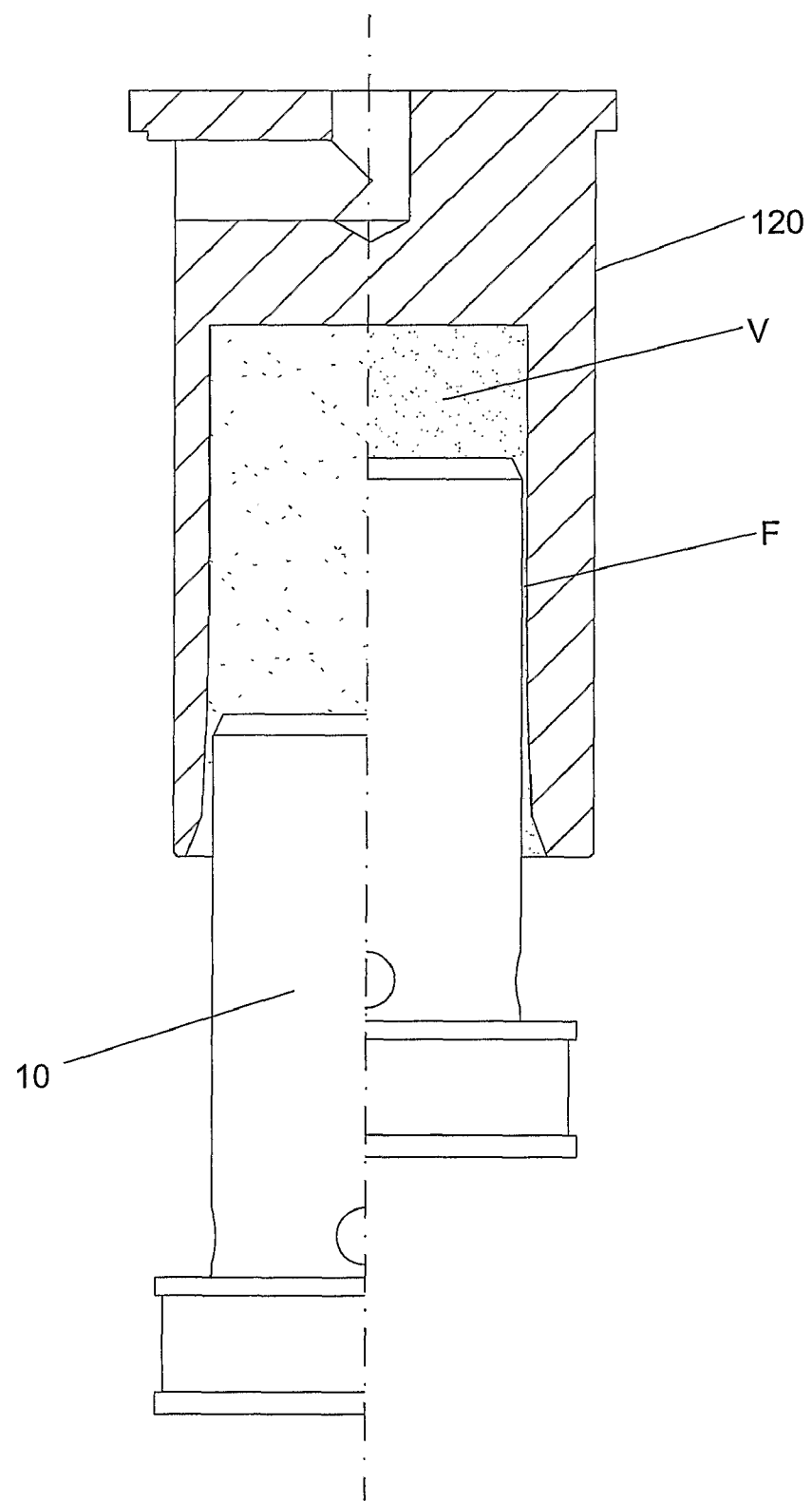
Figure 22:
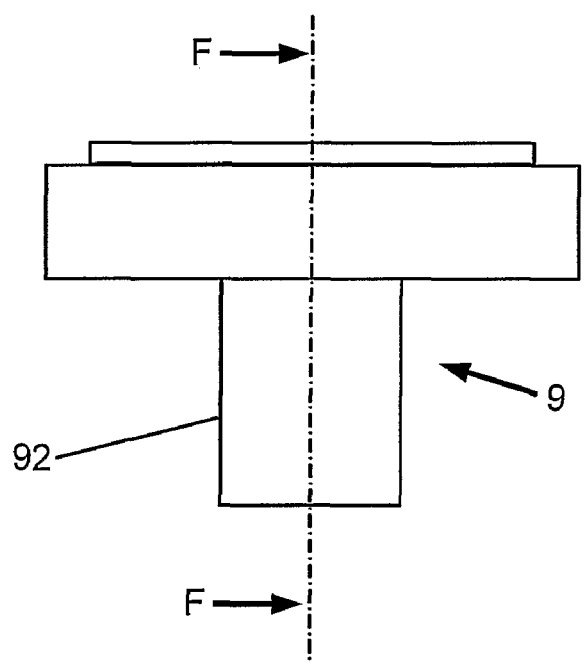
Figure 23:
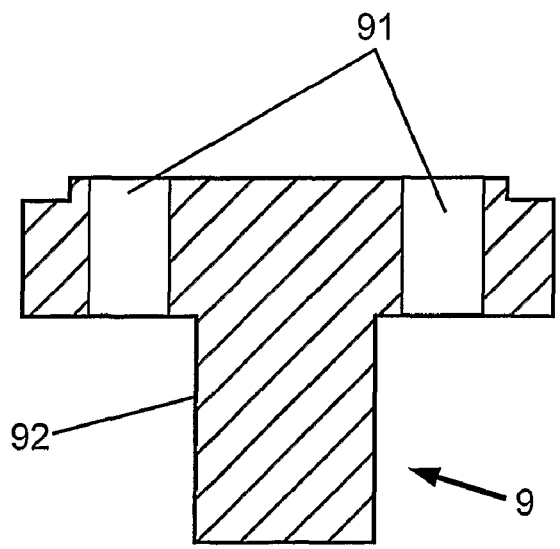
Figure 24:
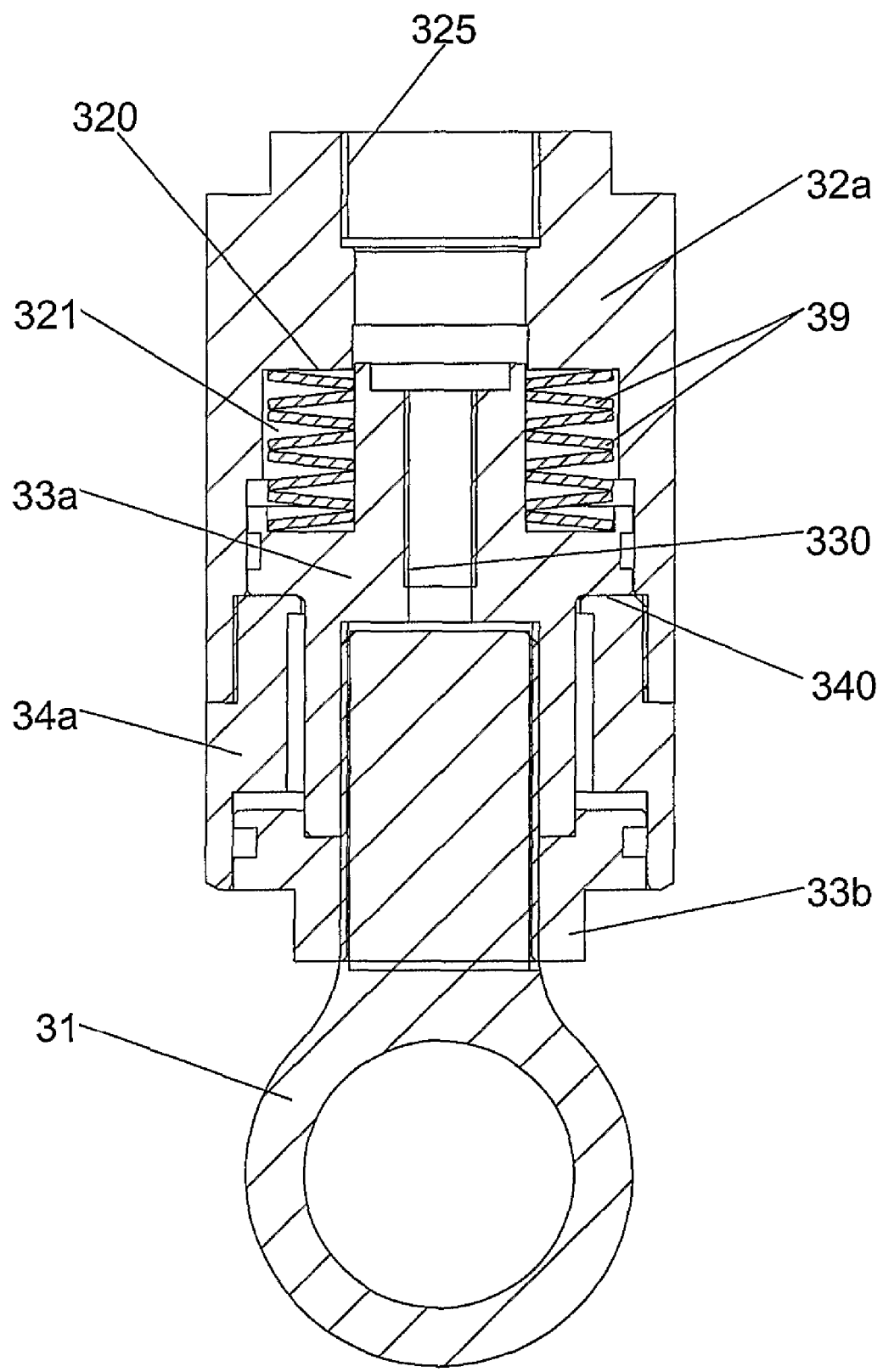

FIGS. 3 to 5 each represent a detailed view of FIG. 2;

FIG. 6 represents a perspective view of the head of the shock absorber system according to the invention;

FIG. 7 represents a cross-sectional view of the head according to the plane B-B of FIG. 3;

FIG. 8 represents a perspective view of the low speed adjustment screw of the shock absorber system according to the invention;

FIG. 9 represents a cross-sectional view of the high speed adjustment screw of the shock absorber system according to the invention;

FIG. 10 represents a bottom view of the anti-return valve of the shock absorber system according to the invention;

FIG. 11 represents a cross-sectional view of the inflation valve of the shock absorber system according to the invention;

FIG. 12 represents a front view of the end stop body;

FIG. 13 represents a cross-sectional view of the end stop body according to the plane CC of FIG. 14;

FIG. 14 represents a back view of the end stop body;

FIG. 15 represents a front view of a first implementation variant of the end stop piston, more particularly adapted to a shock absorber situated in front of a vehicle;

FIG. 16 represents a cross-sectional view of the variant of the end stop piston according to the plane DD of FIG. 15;

FIG. 17 represents a top view of the end stop piston represented on FIG. 16;

FIG. 18 represents a front view of a second implementation variant of an end stop piston, more particularly adapted to a shock absorber situated at the back of a vehicle;

FIG. 19 represents a cross-sectional view according to the plane EE of FIG. 18 of the second variant of the end stop piston according to the invention;

FIG. 20 represents a top view of the end stop piston represented on FIG. 18;

FIG. 21 is composed of two half-views, each representing a state of compression of the end stop piston in the end stop body;

FIG. 22 represents a front view of the anti-return valve;

FIG. 23 represents a cross-sectional view of the anti-return valve according to the plane FF of FIG. 22;

FIG. 24 represents a cross-sectional view of a variant of the shock absorber stem.

The shock absorber system of the present invention, visible in particular on FIGS. 1 to 5, includes an approximately vertical cylindrical body (1). It is screwed at its upper end to a head (2), and at its lower end to a cap (6).

The head (2), visible in particular on FIGS. 3 and 6, includes a fastener (21) allowing attachment of the shock absorber system according to the invention to the vehicle that one wishes to equip with the shock absorber system according to the invention.

The head (2) also includes a reservoir (22), visible in particular on FIGS. 3, 6, and 7, including an opening (23) coupled to the body (1) of the shock absorber system by a channel (24). This opening (23) is provided for the insertion of low speed (4) or high speed (5) adjustment screws for compression, of which the implementation modes are represented respectively on FIGS. 9 and 10. These adjustment screws (4, 5) allow closing more or less of the opening (23) at the time of the compression. This adjustment system can, for example, be constituted by high speed (5) or low speed (4) adjustment screws mounted in such a way that their axis of symmetry are coaxial with the channel (24), as described in the patent application EP 1 085 232.

An end stop body (120) including an interior housing (12) is attached in the top of the shock absorber body (1). This end stop body, visible in particular on FIGS. 13, 14, and 15, is a cylinder of revolution having a vertical axis of which an upper end forms a collar (121) intended to be gripped between the head (2) and the body (1) of the shock absorber to allow the positioning and maintenance of the aforementioned end stop body (120). Near the collar (121), and under it, is arranged a radial boring (122) that communicates with the vertical boring (123) situated at the center of the upper surface of the end stop body (120). The ensemble of these two borings form a channel that allows the oil contained in the body (1) to flow back towards the head (2) of the shock absorber, the latter being traversed by a channel (24). To this purpose, a flat section (124) is realized on the exterior surface of the end stop body, this flat section (124) covering the height included between the collar (121) and the lower end of the end stop body (120). The flat section (124) is arranged in such a way that the boring (122) is pierced at its surface, from an orthogonal direction. A space is thus laid out between the interior surface of the shock absorber body (1) and the flat section (124), which embodies a free passage for the oil of the channel (24) from the head (2) of the shock absorber toward the upper chamber (S) of the body (1), via the borings (122, 123), in a manner so that the compression adjustment screw (4, 5) of the head is coupled to the aforementioned upper chamber (S).

A tube (71) slides in the body (1) with the aid of guides not shown. The exterior diameter of the tube (71) is less than the interior diameter of the body (1) of the shock absorber system to be able to freely slide to the interior of the aforementioned body (1). An approximately cylindrical rod (7) slides freely in the tube (71). The rod (7) is terminated at its upper end by an approximately rectangular section part (75), open at the top. The rectangular section of the rod (7) is less than its cylindrical section.

The tube (71) is screwed, at its upper end, to an annular piece (11) having an exterior diameter approximately equal to the interior diameter of the body (1) of the shock absorber system. A projection (112) is formed on this annular piece (11), in the axis of the tube (71). The aforementioned projection (112) is screwed into the lower part of an extension (8), itself screwed in its upper part, in an end stop piston (10) that is provided with a threaded portion (106). The end stop piston (10), in its lower part (105) is provided with an expanded annular portion (105). The exterior diameter of this expanded portion (105) of the end stop piston (10) is approximately equal to the interior diameter of the body (1) of the shock absorber system.

The annular piece (11) is traversed in the axis of the tube by a boring receiving, in its lower part, the upper end of the tube (71) and, in its part forming projection (112), the upper end of the rod (7). The upper end of the rod (7), having a rectangular section, separates the boring traversing the annular piece (11), in its part (112) forming projection, into two vertical channels (113), included on each side of the rectangular section part (75) and of the rod (7).

An anti-return valve (9) is inserted between the top of the extension (8) and the housing (104) of the end stop piston (10), situated at the level of the expanded part (105). The anti-return valve (9) includes a projection (92) around which is inserted a foil washer, not shown, maintained flattened on the valve (9) by a spring, not shown, that is maintained between the anti-return valve (9) and the upper surface of the aforementioned housing (104).

The exterior diameters of the extension (8) and of the principal body of the piston stop (10) are less than the interior diameter of the body (1) of the shock absorbing system to allow free sliding in the interior of the aforementioned body (1).

The upper chamber (S) of the body (1) of the shock absorber system is delimited, at the top, by the end stop body (12), and at the bottom by the upper surface of the expanded part (105) of the end stop piston (10). In the same manner, the lower surface of the expanded part (105) of the end stop piston (10) and the upper surface of the annular piece (11) delimit the intermediate chamber (M) of the body (1). Finally, the lower surface of the annular piece (11) and the upper surface of the cap (6) delimit the lower chamber (I) of the body (1). The ensemble of the chambers (S, M, I), as well as the space between the tube (71) and the rod (7), are filled with oil.

The expanded part (105) of the end stop piston (10) includes a plurality of vertical channels (101) that allow the passage of oil between the upper chamber (S) and the intermediate chamber (M).

The anti-return valve (9) also includes a plurality of vertical channels (91) that make the connection between the extension (8) and the recess (104) of the end stop piston (10). These vertical channels (91) are sealed by the foil washer (not shown), maintained flat on the valve (9) by the spring (not shown). The end stop piston (10) includes channels (102, 108) that couple the recess (104) and the upper chamber (S).

The annular piece (11) includes a plurality of vertical channels (111) situated between the intermediate chamber (M) and the lower chamber (I), and sealed by the pre-loaded washer (115) defining the compression characteristics of the shock absorber system. In fact, this washer (115) exerts a closing force determined so that the pressure of the oil in the intermediate chamber (M) will prevail so that the oil is driven out toward the lower chamber (I), for the displacement of the end stop piston (10) in the direction of compression.

A plurality of radial channels (72) is formed on the tube (71), at the level of the lower chamber (I). These radial channels (72) emerge on a cavity (73) formed between the tube (71) and the rod (7), by means of a boring made in the upper end of the tube (71). This boring has a diameter slightly greater than the diameter of the body (7). This boring forming a cavity (73) between the rod (7) and the tube (71) can be replaced by flat sections made in the interior of the tube (71), opposing the radial channels (72), to form vertical channels for the passage of the oil between the tube (71) and the rod (7). This passage (73) emerges, at its upper end, on the channels (113) included between the part of the rod (7) having a rectangular section (75) and the projecting part (112) of the annular piece (11).

The upper part of the stem (3) is joined to a cup (not shown) serving to support a spring (not shown) that transmits the weight of the vehicle supported by the head (2) on the lower end of the tube (71), joined to the stem (3) of the shock absorber. The tube (71) is screwed, at its lower end, in a threading (325) of the body (32, 32a) of the stem (3) of the shock absorber system. A fastener (31), allowing the attachment of the shock absorber system to the wheel of the vehicle to be equipped with the aforementioned system, is joined to a stem piston (33, 33a) that slides in the housing (321) of the stem body (32, 32a). The stem piston (33, 33a) is joined to the rod (7) that slides in the tube (71).

When the reaction force with the ground becomes weak (for example, the wheel lifts off the ground), the shock absorber recovers and, for example, in the variant incorporating spring washers (39) in the stem of the shock absorber, the washers (39) push back a stem piston (33a) and separate it from the stem body (32a). The stem piston (33a) then drives the rod (7) towards the bottom, with respect to the tube (71), which enlarges the passage space of the oil, to the other end of the rod (7), between the cavity (73) and the vertical channels (113) of the annular piece. The oil of the lower chamber (I) rises again toward the upper chamber through the radial channels (72) of the tube (71) then through the cavity (73) formed between the tube (71) and the rod (7). The oil is directed next through the vertical channels (113) included on each side of the rectangular section part (75) of the rod (7), then, through the extension (8), the vertical channels (91) of the anti-return valve (9), the housing (104) of the end stop piston (10), and finally the channels (102, 108) of the end stop piston (10). The sealing of the channels (91) of the anti-return valve (9), by means of the foil washer flattened on the valve (9) with the aid of a spring inserted between the foil washer and the upper surface of the housing (104), allows the passage of the oil only in the direction of the lower chamber (I) toward the upper chamber (S), when the shock absorber recovers and prevents the passage of the oil from the upper chamber (S) towards the lower chamber (I), when the shock absorber is compressed. When the position of the rod (7), sliding in the tube (71), augments the passage of the oil from the cavity (73) between the tube (71) and the rod (7) towards the cavity (113) of the annular piece (11), the oil is evacuated towards the upper chamber, via the hollow extension (8), the anti-return valve (9) and the channels (102, 108) of the housing (104) of the end stop piston (10). In this manner, the recovery is much faster, and the piston descends very rapidly in its maximum elongated position that is when the annular piece (11) bumps into the cap (6).

In a first variant of the shock absorber system with rapid recovery, the stem (3) is constituted by a stem body (32) in which slides a pneumatic piston (33) guided by a stem guide (34). The attachment fastener (31) is screwed into the pneumatic piston (33). Two cavities (35, 37) are respectively included between the stem body (32) and the stem piston (33), and between the stem piston (33) and the stem guide (34). Two spaces (36, 38), formed in the stem body (32) and each situated opposing one of the cavities (35, 37), allow each to receive an inflation valve (15), visible in particular on FIG. 12. Each of the inflation valves (15) allows introduction of air under several bars and thus allows varying the pressure in the cavities (35, 37), which permits, by displacement of the piston (33) between the respective stop surfaces (320, 340) of the stem body (32) and of the stem guide (34), varying the height of the rod (7) with respect to the annular piece (11), by sliding, within the tube (71) joined to the stem body (32), of the rod (7) of which the lower end is joined to the stem piston (33). This system thus allows adjusting the flow rate of the oil passing from the cavity (73) formed between the tube (71) and the rod (7), to the vertical channels (113) included on each side of the rectangular section part (75) of the rod (7), and therefore to modify the recovery speed.

A second variant of the shock absorber system with rapid recovery, visible on FIG. 25, includes using conical spring washers (39) in the stem (3) of the shock absorber. In this configuration, the threading (325), in which is screwed the tube (71), emerges in the approximately cylindrical housing (321) having a diameter greater than that of the threading (325). The housing (321) receives a stem piston (33a) provided with a threading (330) intended for the attachment of the rod (7). The end of the piston (33a) opposed to the threading (330), is screwed the fastener (31). Between the piston (33a), and the fastener (31) is sandwiched a secondary piston (33b) that slides in a guide (34a) screwed on the stem body (32a). The secondary piston (33b) allows sealing the housing (321) of the stem body (32a). A plurality of conical spring washers (39) is interposed between the piston (33a) and the upper (320) or lower (340) surface of the housing (321). These conical spring washers (39), called "Belleville", are mounted in opposition two by two and are all identical. This mounting allows the addition of elementary clearances of the washers (39). These spring washers (39) allow assurance of functioning identical to that of the shock absorber system using the pneumatic (33) piston, visible on FIG. 5. In fact, when the conical spring washers (39) are mounted between the piston (33a) and the upper support surface (320) of the housing (321), they are compressed when a compression force is applied on the shock absorber and relaxed when the reaction force with the ground tends to be annulled. In recovery, the washers (39) push back the piston (33a). The latter being joined to the rod (7), it drives a displacement of the rod (7) with respect to the tube (71). This displacement allows the functioning of the rapid recovery system, which is therefore facilitated by the presence of the washers (39) between the piston (33a) and the upper surface (320) of the housing (321). To the contrary, for certain vehicles, it is preferable to trigger the rapid recovery system later, that is for the very weak reaction forces with the ground. In this case, the washers (39) will be interposed between the piston (33a) and the interior surface (340) of the housing (321), in a manner to push back the piston (33a) toward the top. Thus, the triggering of the rapid recovery system, that is the opening of a larger section for passage of the oil through the vertical channels (113), will be made when the weight of the vehicle wheel exerts a sufficient force on the fastener (31), towards the ground, to compress the washers (39). The location, the number, and the dimensions of the washers (39) are variable and depend on numerous factors (position of the shock absorber, weight and type of vehicle, desired behavior of the shock absorber, etc.) The thickness of the conical spring washers (39) used depends on the force permitted. The number of washers (39) will depend, among other factors, on their thickness and on the desired clearance. The number of conical spring washers (39) used will be for example eight. The exterior diameter of the washers (39) will be slightly less than the interior diameter of the housing (321).

The first implementation variant of the shock absorber system with rapid recovery including using air pressure arranged between the two cavities (35, 37), as represented in FIG. 12, allows adjustment of the force with which the sliding will be triggered, towards the bottom, of the rod (7) in the tube (71). This variant allows adjustment of the applied prestressing on the stem piston (33, 33a) and thus determining the threshold for the triggering of the rapid recovery. This variant will be in general used, for example, in the phases of test and adaptation of the shock absorber characteristics to the vehicle and to the path encountered by the vehicle. Once the value of the pneumatic force is determined to obtain an optimal result of the prestressing to be applied on the stem piston (33, 33a), determining the triggering threshold for the rapid recovery, one replaces the pneumatic shock absorber by a mechanical shock absorber, as for example "Belleville" washers, of which the physical characteristics will have been specified to obtain a prestressing corresponding to the determined optimal pressure on the shock absorber with rapid pneumatic recovery. This therefore allows having a reliable and easy system of tests and adjustment, taking into account realities of the terrain, and to rapidly replace this system of tests by a robust mechanical system for use of long duration or in competition.

The hydraulic end stop piston (10a, 10b) more particularly visible in particular on FIGS. 16, 17, 18, 19, 20 and 21, is a piston of which an upper part (103) has an exterior cylindrical shape overbridged by a portion (107) having a tapered shape. The end stop piston (10a, 10b) is intended to cooperate with the end stop body (120). The end stop body (120) includes at its lower end a housing (12) opening at the lower end of the end stop body (120) and closed at the opposite end. The internal surface of the housing (12) is a surface of continuous revolution composed of several sections (12a, 12b, 12c, 12d). The section (12d), the farthest from the opening of the housing (12), has a cylindrical shape. The three other sections (12a, 12b, 12c) have a tapered shape, and the taper of these three sections is different, this being larger as the section concerned is closer to the opening of the housing (12). The cylindrical section (12d) constitutes the smallest diameter of the housing (12). This diameter is very near the exterior diameter of the end stop piston (10a 10b), but slightly greater than the latter. Thus, when the tube (71) is compressed at high speed into the body (1), for example when the vehicle runs into a bump or a hole, the end stop piston (10a, 10b) is going to penetrate to the interior of the housing and come to trap a volume (V) of oil contained in the housing (12). As its progression goes along into the interior of the housing (12), the end stop piston (10a, 10b) is going to progressively compress the volume (V) of oil contained in the housing (12), which creates in this manner a progressive resistance to the compressing of the end stop piston (10a, 10b). The progression of the resistance to the compression of the end stop piston (10a, 10b) is assured by means of the profile of the housing (12), as visible on FIG. 12. In fact, the conical sections (12a, 12b, 12c) near the opening of the housing (12) create a sufficient space between the exterior surface of the end stop piston (10a, 10b) and the interior surface of the housing (12) so that a part of the oil contained in the housing (12) can reflow towards its exterior. As the progression of the end stop piston (10a, 10b) goes along in the housing (12), the volume of oil reflowing is weaker and weaker, thus progressively augmenting the resistance to the pushing of the end stop piston (10a, 10b). When the piston reaches the cylindrical portion (12d) of the housing (12), the space remaining between these two pieces, resulting from a difference between the interior diameter of the housing (12) and the exterior diameter of the end stop piston (10a, 10b), allows the formation of an oil film (F) reflowing at very high pressure. This oil film (F) plays then the role of lubricating and allows avoiding the rubbing of metal against metal during the repeated movements of the end stop piston (10a, 10b) within the housing (12) of the end stop body (120). The very weak compressibility of the oil permits attainment of a very high resistance at the end of the stroke.

FIGS. 6, 7 and 8 on the one hand, and FIGS. 9, 10, and 11 on the other hand, represent respectively a first and a second variant of the end stop piston (10a, 10b). The first variant (10a) of the end stop piston is more particularly adapted to a shock absorber intended for a wheel situated at the back of the vehicle. The second variant (10b) is more particularly adapted to a shock absorber intended for a wheel situated at the front of the vehicle. The two end stop pistons (10a, 10b) have numerous common features, including the upper cylindrical part (103), overbridged by a conical portion (107). The lower part of the end stop piston (10a, 10b) is an approximately cylindrical portion (105), having a diameter slightly less than the interior diameter of the body (1) of the shock absorber. This cylindrical portion (105) is traversed by a plurality of vertical channels (101) allowing the passage of the oil. The open cylindrical housing (104) is located at the lower end of the end stop piston (10a, 10b). A portion near the opening of the housing (104) presents a threading (106) that allows the attachment of the extension (8). A portion near to base of the housing, having a diameter adapted to the anti-return valve (9), is visible on FIGS. 11, 23 and 24. The first variant of the end stop piston (10a) includes above the lower cylindrical portion (105) four radial borings that embody four channels (102) coupling the housing (104) to the exterior of the end stop piston. The second variant of the end stop piston (10b) includes four vertical borings (108) arranged on a common diameter of the upper surface of the tapered portion (107). These four borings (108) are equal distant and open in the housing (104). For the two variants of the end stop piston (10a, 10b), the channels (respectively 102 and 108) serve for the transit of the oil during the recovery phase of the shock absorber. In the case of the end stop piston (10a) of the first variant, the channels (102) are horizontal and the oil is evacuated to the periphery of the end stop piston (10a) during the recovery phase. In the case of the end stop piston of the second variant (10b), the oil circulating in the channels (108) during the recovery phase emerges in the housing (12) of the end stop body (120). This has the effect of very strongly diminishing the resistance to the retreating movement of the end stop piston (10b) caused by the volume of oil under high pressure contained in the housing (12), thus allowing a rapid retreat of the end stop piston (10b).

It will be obvious to persons versed in the art that the present invention allows implementation modes under numerous other specific forms without departing from the field of application of the invention as claimed. Consequently, the present implementation modes must be considered by way of illustration but can be modified in the field defined by the scope of the attached claims.

The invention claimed is:

1. A shock absorber system including a stem and a body, in which slides a piston mounted on a first end of a tube and defining at the least an upper chamber and a lower chamber in the body, the stem of the shock absorber including a stem body, joined to the second end of the tube and supporting a cup on which a spring transmits the weight of the vehicle, characterized in that the stem body includes an approximately cylindrical housing, in which slides a piston, an end of the piston being joined to a first end of a rod sliding in the tube and another end of the piston being joined to an attachment fastener of the shock absorber on the vehicle, and in that a prestressing means exert a force that tends to displace the piston sliding in the stem body, driving the rod in its displacement, depending on a balance between a force applied on the fastener joined to the stem piston and the force exerted by the prestressing means, the displacement of the rod towards the bottom resulting in the opening, at the second end of the rod, of a larger section for passage of oil from the lower chamber towards the upper chamber and, consequently, a rapid recovery of the shock absorber system, characterized in that the piston is constituted by an end stop piston and an annular piece coupled between themselves by a hollow extension, and defining an upper chamber, an intermediate chamber and a lower chamber, the end stop piston including a recess in which is lodged an anti-return valve sealed by a foil washer overbridged by a spring, and in that the oil passage from the lower chamber towards the upper chamber includes a recess of an annular piece in which the second end of the rod, having a rectangular section, forms vertical channels, that communicate with a cavity situated between the rod and the tube, in communication with the lower chamber, via radial channels bored in the tube and with the interior of the hollow extension, in communication with the upper chamber, via the anti-return valve, the recess and passage sections of the end stop piston, the opening of a larger section of the oil passage allowing a rapid recovery of the shock absorber system.

2. A shock absorber system according to claim 1 characterized in that the prestressing means include a pressure differential between pneumatic cavities situated on each side of the piston, the pressure differential allowing definition of a direction and a value of the prestressing force applied on the piston.

3. A shock absorber system according to claim 1 characterized in that the prestressing means include a plurality of conical spring washers interposed between the piston and the housing.

4. A shock absorber system according to claim 3 characterized in that the conical spring washers are mounted in opposition two by two.

5. A shock absorber system according to claim 3 characterized in that the number of conical spring washers is between 5 and 20.

6. A shock absorber system according to claim 1 characterized in that a minimum value of a reaction force with the ground with which is produced the opening of the larger section for passage of oil is adjustable by the pressure differential, or by the number, the shape, the piling and the position of the washers.

7. A shock absorber system according to claim 6 further including two inflation valves filled with air under pressure, each in communication with one of the chambers.

8. A shock absorber system according to claim 1 further including an end stop body, a cylindrical portion of the end stop piston trapping and compressing a volume of oil contained in an internal housing of the end stop body during the movement of compression of the shock absorber, the internal housing of the end stop body being symmetric with respect to an axis of revolution and provided with a tapered input portion, followed by several tapered portions of decreasing taper.

9. A shock absorber system according to claim 1 characterized in that the end of the end stop piston near the end stop body has a tapered shape.

10. A method of using a shock absorber system according to claim 1, the method comprising installing the shock absorber system, determining a value of pneumatic pressure allowing sliding of the piston in its housing, and subsequently replacing the shock absorber system with a system with rapid recovery in which the prestressing means are washers configured in accordance with the determined value of pneumatic pressure.

11. A shock absorber system including a stem and a body, in which slides a piston mounted on a first end of a tube and defining at the least an upper chamber and a lower chamber in the body, the stem of the shock absorber including a stem body, joined to the second end of the tube and supporting a cup on which a spring transmits the weight of the vehicle, characterized in that the stem body includes an approximately cylindrical housing, in which slides a piston, an end of the piston being joined to a first end of a rod sliding in the tube and another end of the piston being joined to an attachment fastener of the shock absorber on the vehicle, and in that a prestressing means exert a force that tends to displace the piston sliding in the stem body, driving the rod in its displacement, depending on a balance between a force applied on the fastener joined to the stem piston and the force exerted by the prestressing means, the displacement of the rod towards the bottom resulting in the opening, at the second end of the rod, of a larger section for passage of oil from the lower chamber towards the upper chamber and, consequently, a rapid recovery of the shock absorber system, characterized in that the body of the shock absorber also includes an end stop body attached at an upper end of the body of the shock absorber, a cylindrical portion of an end stop piston trapping and compressing a volume of oil contained in an open internal housing of the end stop body during the movement of compression of the shock absorber, the internal housing of the end stop body being symmetric with respect to an axis of revolution and provided with a tapered input portion, followed by several tapered portions, of decreasing taper, a portion near the base of the housing being cylindrical and having a diameter slightly greater than the diameter of the end stop piston, to allow that a fraction of a volume of the oil contained in the end stop body can reflow between the piston and the end stop body, the fraction diminishing with an advancement of the end stop piston, which allows generating a resistance to increasing compression, which also permits the formation of a film of oil having high pressure between the piston and the end stop body, which lubricates the contact between the surfaces of the piston and the end stop body during alternate and repetitive movements of the end stop piston in the housing of the end stop body, characterized in that the end stop body is a cylinder of revolution having a diameter approximately equal to the interior diameter of the shock absorber body, a flat section being built from the lower end of the end stop body up to a radial boring emerging on a second vertical boring situated at a summit of the end stop body, to a center of the end stop body, the two borings communicating between themselves, the ensemble of the two borings and of the flat section embodying a free passage for the oil from the body towards a head of the shock absorber.

12. A shock absorber system including a stem and a body, in which slides a piston mounted on a first end of a tube and defining at the least an upper chamber and a lower chamber in the body, the stem of the shock absorber including a stem body, joined to the second end of the tube and supporting a cup on which a spring transmits the weight of the vehicle, characterized in that the stem body includes an approximately cylindrical housing, in which slides a piston, an end of the piston being joined to a first end of a rod sliding in the tube and another end of the piston being joined to an attachment fastener of the shock absorber on the vehicle, and in that a prestressing means exert a force that tends to displace the piston sliding in the stem body, driving the rod in its displacement, depending on a balance between a force applied on the fastener joined to the stem piston and the force exerted by the prestressing means, the displacement of the rod towards the bottom resulting in the opening, at the second end of the rod, of a larger section for passage of oil from the lower chamber towards the upper chamber and, consequently, a rapid recovery of the shock absorber system, characterized in that the body of the shock absorber also includes an end stop body attached at an upper end of the body of the shock absorber, a cylindrical portion of an end stop piston trapping and compressing a volume of oil contained in an open internal housing of the end stop body during the movement of compression of the shock absorber, the internal housing of the end stop body being symmetric with respect to an axis of revolution and provided with a tapered input portion, followed by several tapered portions, of decreasing taper, a portion near the base of the housing being cylindrical and having a diameter slightly greater than the diameter of the end stop piston, to allow that a fraction of a volume of the oil contained in the end stop body can reflow between the piston and the end stop body, the fraction diminishing with an advancement of the end stop piston, which allows generating a resistance to increasing compression, which also permits the formation of a film of oil having high pressure between the piston and the end stop body, which lubricates the contact between the surfaces of the piston and the end stop body during alternate and repetitive movements of the end stop piston in the housing of the end stop body, characterized in that the end stop piston includes at its lower end an enlarged portion, having a diameter approximately equal to the interior diameter of the shock absorber body, and provided with a plurality of vertical channels forming a free passage for the oil.

13. A shock absorber system including a stem and a body, in which slides a piston mounted on a first end of a tube and defining at the least an upper chamber and a lower chamber in the body, the stem of the shock absorber including a stem body, joined to the second end of the tube and supporting a cup on which a spring transmits the weight of the vehicle, characterized in that the stem body includes an approximately cylindrical housing, in which slides a piston, an end of the piston being joined to a first end of a rod sliding in the tube and another end of the piston being joined to an attachment fastener of the shock absorber on the vehicle, and in that a prestressing means exert a force that tends to displace the piston sliding in the stem body, driving the rod in its displacement, depending on a balance between a force applied on the fastener joined to the stem piston and the force exerted by the prestressing means, the displacement of the rod towards the bottom resulting in the opening, at the second end of the rod, of a larger section for passage of oil from the lower chamber towards the upper chamber and, consequently, a rapid recovery of the shock absorber system, characterized in that a recess of the end stop piston includes a threaded portion that serves as a means of attachment of the extension, an anti-return valve being sandwiched between the base of the housing and the extension, the anti-return valve being provided with a plurality of vertical channels that communicate with channels coupling the recess to the exterior of the end stop piston when the anti-return valve is in open position, thus forming a free passage for the oil.

14. A shock absorber system according to claim 13, characterized in that the end stop piston is provided with a plurality of vertical channels coupling the base of the housing to the horizontal surface constituting the end of the end stop piston near the end stop body.

15. A shock absorber system according to claim 13 characterized in that the end stop piston is provided with radial horizontal channels.

* * * * *